United States Patent [19]

Sawano et al.

[11] Patent Number: 4,549,797

[45] Date of Patent: Oct. 29, 1985

[54] METHOD AND APPARATUS FOR POSITIONING MICROFICHE CARD

[75] Inventors: Yukio Sawano; Masaru Ono, both of Tokyo, Japan

[73] Assignee: Fuji Photo Film Co., Ltd., Kanagawa, Japan

[21] Appl. No.: 493,264

[22] Filed: May 10, 1983

[30] Foreign Application Priority Data

May 10, 1982 [JP] Japan .................. 57-78013

[51] Int. Cl.[4] ........................... G03B 23/08
[52] U.S. Cl. ................................ 353/27 A
[58] Field of Search ............... 353/25, 26 R, 26 A, 353/27 R, 27 A

[56] References Cited

U.S. PATENT DOCUMENTS

| | | | |
|---|---|---|---|
| 3,885,867 | 5/1975 | Nelson et al. | 353/27 A |
| 4,033,684 | 7/1977 | Toriumi et al. | 353/27 A |
| 4,041,457 | 8/1977 | Koch | 353/25 X |
| 4,315,322 | 2/1982 | Osaki et al. | 353/27 A |
| 4,408,287 | 10/1983 | Parisot et al. | 353/27 A X |
| 4,443,858 | 4/1984 | Piaton | 353/27 A X |

FOREIGN PATENT DOCUMENTS 0029390  5/1981  European Pat. Off. .......... 353/27 A

*Primary Examiner*—Harry N. Haroian
*Attorney, Agent, or Firm*—Young & Thompson

[57] ABSTRACT

A microfiche reader is provided with pulse motors which move a microfiche card in X and Y direction so as to position a required frame image on the microfiche card in an optical projection path. Using the symbol AF for the maximum number of frames recordable on the microfiche card, the symbol AS for the maximum number of pulse signals required to move the microfiche card from the datum position to the limit position, and the symbol PF for the location number of a required frame, the address number NS of a required frame can be calculated according to the equation $$NS = PF \cdot AS/AF$$

The number MS of pulse signals required to move the microfiche card from a present position to the required position is obtained from the difference between the address number NS of the required frame and the address number OS of the frame actually in the optical projection path. Pulse signals corresponding to the number MS are generated to control a pulse motor.

1 Claim, 3 Drawing Figures

METHOD AND APPARATUS FOR POSITIONING MICROFICHE CARD

BACKGROUND OF THE INVENTION

This present invention relates to a method and apparatus for automatically moving a microfiche card including a large number of frame images in matrix so as to position a required frame in an optical projection path, projecting the required frame image onto a screen.

There is provided, in a microfiche card, a matrix arrangement of a large number of frames arranged in X (column) and Y (row) directions and within each frame there is photographically recorded an image containing information of high density, so that microfiches are widely used on various fields wherein an extremely large quantity of information must be dealt with. In order to project a required or selected frame image on the microfiche card onto a screen, a microfiche projection apparatus is used. The microfiche projection apparatus comprises an optical system for projecting a required or selected frame image onto a screen, a stage movable along a path in X and Y directions on which the microfiche card is placed and held, two pulse motors for moving the stage along a path in X and Y direction, respectively, a memory means which stores frame data corresponding to code numbers of respective frames on the microfiche card, and a micro-computer for individually controlling the pulse motors based on the frame data retrieved from the memory means upon the entry of the code number of a required frame to be projected. Upon specifying a required frame by its code number, the micro-computer retrieves the frame data which represent the location numbers in X and Y direction, the location number meaning where the required frame is from the reference or datum frame in each direction. Using the symbols PF(X) and PF(Y) for location numbers of the frame in X and Y directions, respectively, and the symbol N for the number of pulse signals required to shift the microfiche card by one frame in either X or Y direction by means of pulse motors, the address numbers NS(X) and NS(Y) which represent the numbers of pulse signals required to move the microfiche card in X and Y directions from the datum position wherein the datum frame is in the optical projection path to a position wherein a required frame is in the optical projection path are given by the following equations;

$$NS(X) = PF(X) \times N \quad (1)$$

$$NS(Y) = PF(X) \times N \quad (2)$$

Assuming the address numbers of the frame now in the optical projection path are represented by the symbols OS(X) and OS(Y), the signal number MS(X) and MS(Y) which represent the numbers of pulse signals required to shift the microfiche card directly from the present position to the required position wherein the required frame is in the optical projection path are given by the following equations;

$$MS(X) = NS(X) - OS(X) \quad (3)$$

$$MS(Y) = NS(Y) - OS(Y) \quad (4)$$

wherein it should be understood that the rotational direction of pulse motor depends on whether the result from the equation (3), or (4) is negative or positive. Consequently, direction and duration of the rotation of the pulse motor are controlled by the arithmetically derived result from the equation by the micro-computer so as to locate the microfiche card in a required position, positioning a required frame image in the optical projection path.

In conventional microfiche projection apparatus described above, the address number of a required frame is obtained from the product of the location number frame and the predetermined number of pulse signals by which a rotation of pulse motor is controlled to cause a motion of the microfiche card by one frame. In this X—Y positioning, it would be very desirable that the number of pulse signals for the motion of microfiche card by one frame be an integer. A predetermined number of pulse signals having a fraction is unfavorable in accurately locating the microfiche card in a proper position because of accumulated error. Assuming, for example, the rotational motion of the pulse motor per one pulse causes a microfiche card to move 0.5 mm and the length of the side of a frame in both X and Y directions is "9.8" mm, the number of pulse signals required to move a microfiche card by one frame, which is actually "19.6," becomes "20" by counting fractions of "0.5" and over as a unit and omitting the rest. There thus occurs a positional error corresponding to "0.4" pulse signal for every frame, resulting in the microfiche card getting out of position where a required frame is to be positioned every time the microfiche card is moved. Consequently, the frame image gets out of proper position on a screen.

SUMMARY OF THE INVENTION

It is consequently an essential object of the present invention to provide a method and an apparatus for automatically moving a microfiche card so as to accurately position a required frame image on the microfiche card in an optical projection path.

It is another object of the present invention to provide a method and an apparatus for enssuring that a microfiche card can be moved to position a required frame image on the microfiche card in an optical projection path without any accumulated error in position.

These and other objects of the present invention are achieved by arithmetically operating the address number of a required frame image to be projected onto a screen according to the fact that the maximum number of pulse signals required to move a microfiche card by the maximum number of frame images recordable on the microfiche card and the number of pulse signals required to move the microfiche card to a position wherein a required frame image on the microfiche card is in the optical projection path are proportional to each other. This method can avoid accumulated error in positioning the microfiche card which has occurred in conventional positioning methods and apparatus wherein the address number of a required frame image is obtained from the product of the number of pulse signals required to move the microfiche card by one frame image and the location number of a required frame image. Consequently, in this method, a required frame image can be accurately positioned in the optical projection path despite an imperceptible error in depending on making the address number integral. This method shows the best results when using a microfiche card which includes frame images at reduction ratios of approximately 100× or over and which is required to be positioned with extreme accuracy.

BRIEF DESCRIPTION OF THE DRAWINGS

Other objects and features of the present invention will become apparent to those skilled in the art from a consideration of the following description, taken in conjunction with the accompanying drawings, in which.

DETAILED DESCRIPTION OF THE INVENTION

Figure 1:
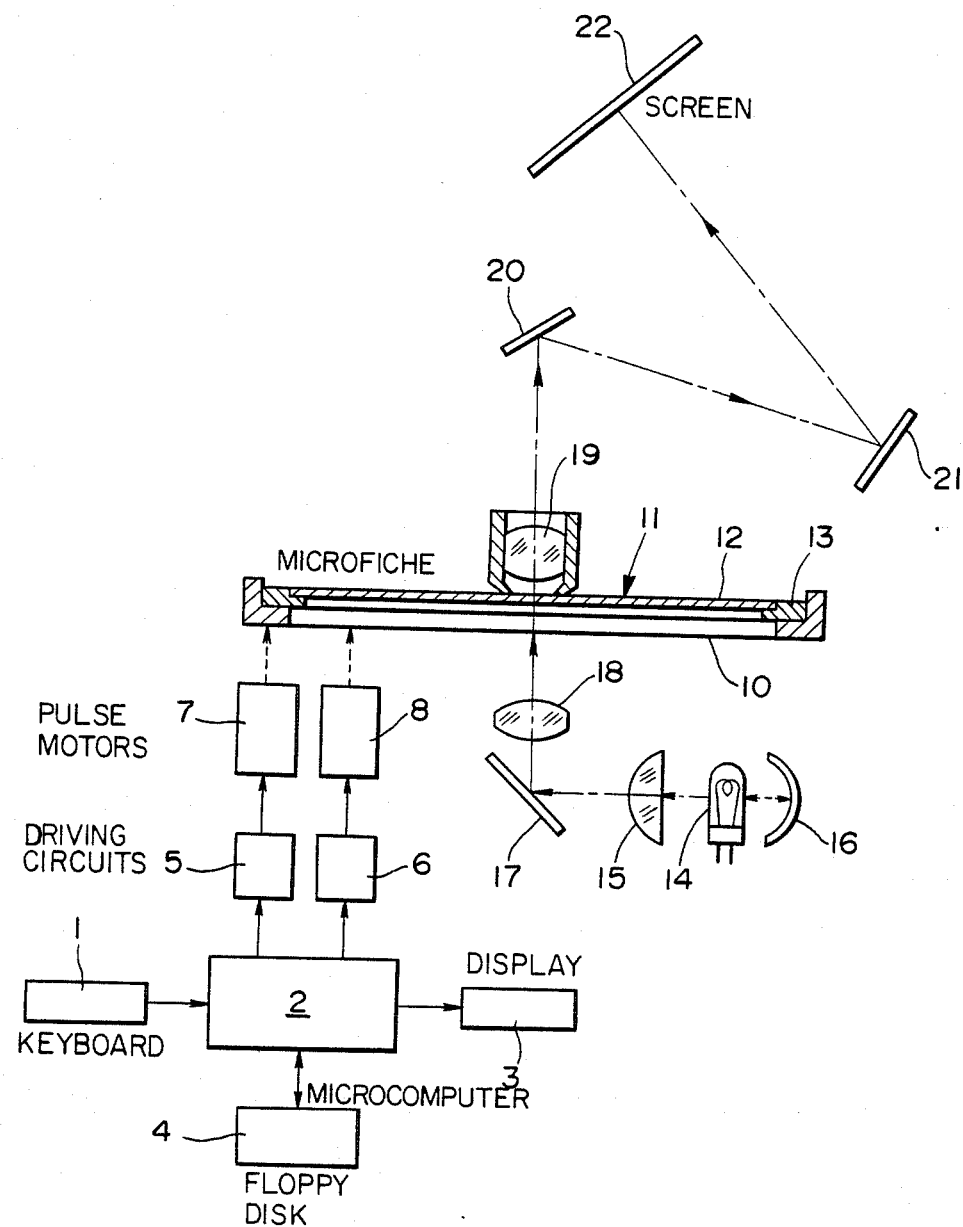
FIG. 1 is an explanatory view showing a microfiche projection apparatus according to the present invention.

Referring now to FIG. 1 showing a microfiche projection apparatus embodying the present invention, there is shown a keyboard arrangement 1, such as tenkey, clear-key, start-key and the like operation is initiated by an operator entering a code number of a required frame on a microfiche card into the keyboard 1. The information of this code number, which is shown on a display screen 3, is supplied to a micro-computer 2 to retrieve the address data according to the code number of the required from a floppy disk unit 4 upon pushing the start-key on the keyboard 1. The micro-computer 2 performs arithmetic operations based on the address data and the address number of a frame now positioned in an optical projection path to obtain the numbers of pulse signals which are represented by the symbols MS(X) and MS(Y) so as to generate pulse signals the numbers of which correspond to the numbers MS(X) and MS(Y) and which are supplied to driving circuits 5, 6 for pulse motors 7, 8, one for X direction and the other for Y direction. The respective driving circuit under the influence of pulse signals controls the pulse motor in rotational duration and direction. These pulse motors can move a movable stage 10 in X and Y direction, respectively, through a well-known X−Y driving mechanism. On the stage 10 a microfiche card 11 comprising a microfiche film 12 including a large number of frame images and a peripheral frame 13 is mounted and moved together therewith.

The light of a light source or lamp 14 is projected by a pair of condenser lens arrangements 15, 18 via mirror 17. A reflector 16 is behind the lamp 14 to reflect the back light into the optical path of the condenser lens arrangements. An image forming lens arrangement 19, which is floatingly mounted so that the image forming lens arrangement 19 and the microfiche film 12 always have the same spatial relationship, can focus an enlarged image of the microfiche film 12 onto a back projection screen 22 via mirror 20, 21.

Figure 2:
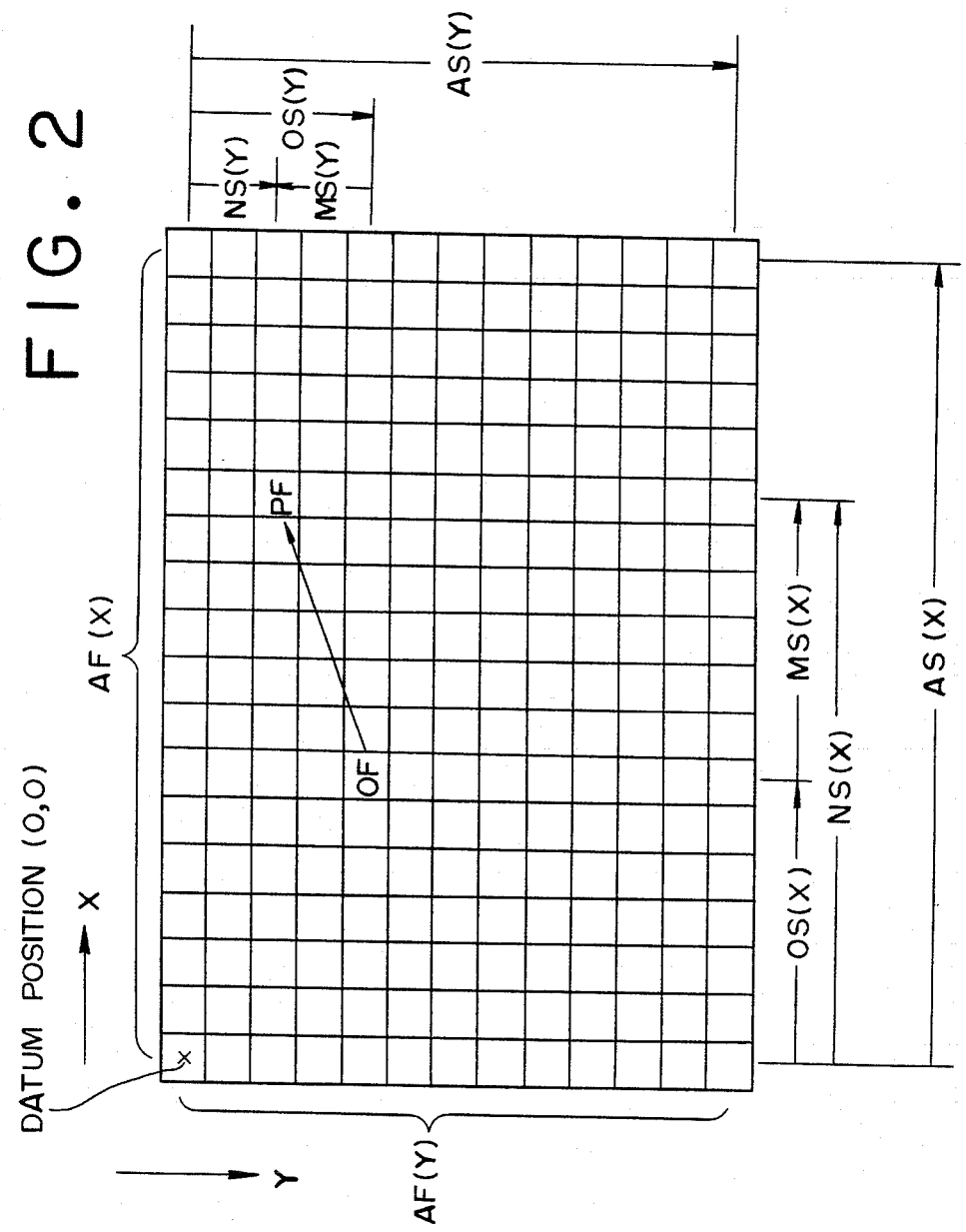
FIG. 2 is a plan view showing a microfiche card.

FIG. 2 illustrates the arrangement of frames on the microfiche card. It is described hereinafter how the microfiche card 11 is changed in position from one to another, for example from the position wherein the frame image OF is in the optical projection path to the position wherein the required frame image PF is subsequently positioned in the optical projection path. In this drawing, the symbol AF represents the maximum number of frame images recordable in one direction. The symbol AS represents the maximum number of pulse signals required to drive the pulse motor so as to move the microfiche card 11 from the datum position wherein the datum frame image is in the optical projection path to the limit position wherein the endmost frame image is positioned in the optical projection path. The symbol NS means the address number of a required frame image to be projected which represents the number of pulse signals required to drive a pulse motor so as to move the microfiche card 11 from the datum position to the requird position wherein a required frame image is in the optical projection path. The symbol OS means the address number of a frame image now positioned in the optical projection path which represents the number of pulse signals required to drive a pulse motor so as to move the microfiche card 11 from the datum position to the present position. The symbol MS represents the number of pulse signals required to control the pulse motor so as to move the microfiche card 11 from the present position to the required position. Because of the microfiche card 11 moving individually in X and Y directions, each symbol is used with sign (X) or (Y) according to the direction of motion.

Figure 3:
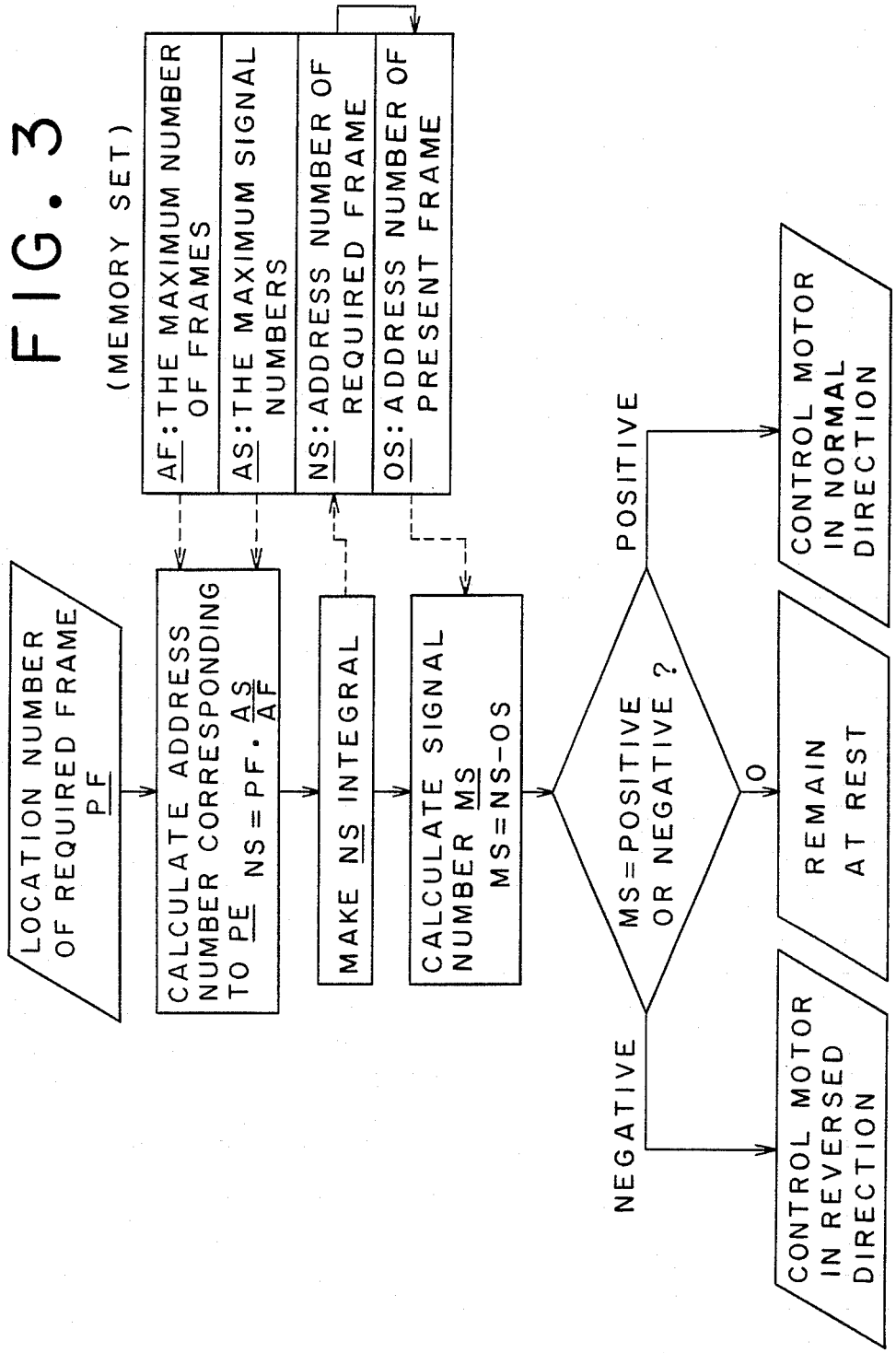
FIG. 3 shows a procedure for performing a method of the present invention.

FIG. 3 shows a procedure for performing a method of the present invention. The maximum number AS of pulse signals is previously counted in such a way that the stage 10 is moved by manual operation from the datum position to the limit position for each direction, while observing projected images on the display screen 22. The maximum number AS of pulse signals and the maximum number AF of frame images recordable in one direction are stored in a register of the micro-computer 2 prior to operation. The maximum number settng is necessary for every different format of microfiche card.

As previously described, in order to project a required frame image on a microfiche card, the location number PF of the required frame image is retrieved from the floppy disk unit 4 in response to the entry of the required frame's code number on the keyboard. Based on the location number PF thus retrieved, the maximum frame number AF and the maximum pulse signal number AS both previously stored in the register of the micro-computer 2, the address number NS of the required frame image is obtained according to the following equation (5)

$$NS = PF \times AS/AF \tag{5}$$

If the thus obtained address number NS includes fractions, it is made an integral number by counting fractions of "0.5" and over as a unit and disregarding the rest. The number MS of pulse signals is calculated as the difference between the address numbers NS and OS by the following equation (6);

$$MS = NS - OS \tag{6}$$

The number MS of the pulse signals thus calculated is stored in the register. As previously described, the rotational direction of pulse motor depends on whether the number MS is positive or negative.

Then pulse control circuits generate pulse signals and supply them to the motor control circuits 5, 6, respectively. A counter counts pulse signals generated one by one until the content of the counter coincides with the number MS. This procedure is carried out for X and Y directions, respectively. In this way, the required frame image can be accurately positioned in the optical projection path.

While the invention has been shown and described with reference a specific embodiment thereof, it should be clearly understood that those skilled in the art will make changes without departing from the spirit and scope of the invention as defined in the appended claims concluding the specification.

What is claimed is:

1. A method of moving a microfiche card including a matrix arrangement of a large number of frame images arranged in X and Y directions so as to position a required frame image to be projected onto a screen in an optical projection path comprising the steps of:

calculating the address numbers $NS(X)$ and $NS(Y)$ of a required frame image in X and Y directions, respectively, using the equations $$NS(X) = PF(X) \cdot (AS(X)/AF(X))$$

$$NS(Y) = PF(Y) \cdot (AS(Y)/AF(Y))$$

in which $AF(X)$ and $AF(Y)$ represent the total number of frame images on the microfiche card in X and Y direction, respectively; $AS(X)$ and $AS(Y)$ represent the maximum number of pulse signals required to move the microfiche card from a position where the frame image placed at one end of the microfiche card is positioned in the optical projection path to a position where the frame image placed at the opposite end of the microfiche card in X and Y direction, respectively, is positioned in the optical projection path; $PF(X)$ and $PF(Y)$ are the location numbers of said required frame image in X and Y direction, respectively, which designate the position of said required frame image relative to the position of a predetermined datum frame image on the microfiche card;

rounding off the numbers obtained by calculating said equations to the nearest integer so as to make said address numbers $NS(X)$ and $NS(Y)$ integral figures respresenting an integral number of pulse signals;

calculating the numbers of $MS(X)$ and $MS(Y)$ representing the number of pulse signals required to move the microfiche card, in X and Y direction, respectively, from a present position to said required position using the equations $$MS(X) = NS(X) - OS(X)$$

$$MS(Y) = NS(Y) - OS(Y)$$

in which $OS(X)$ and $OS(Y)$ are integral numbers representing the address numbers in X and Y direction, respectively, of the frame image presently positioned in the optical projection path;

moving a stage on which the microfiche card is placed and held in X and Y direction by means of pulse motors;

driving said pulse motors according to said calculated pulse signal numbers $MS(X)$ and $MS(Y)$, respectively.

* * * * *